Oct. 20, 1959 C. R. KEYS 2,909,296
LOAD HANDLING EQUIPMENT AND RECEPTACLES FOR VEHICULAR
TRANSPORTATION AND DISCHARGE OF LOADS
Filed Feb. 9, 1956 5 Sheets-Sheet 1

INVENTOR
Conrad R. Keys

BY Lancaster, Allwine & Rommel
ATTORNEYS

Oct. 20, 1959 C. R. KEYS 2,909,296
LOAD HANDLING EQUIPMENT AND RECEPTACLES FOR VEHICULAR
TRANSPORTATION AND DISCHARGE OF LOADS
Filed Feb. 9, 1956 5 Sheets-Sheet 2

INVENTOR
Conrad R. Keys

BY *Lancaster, Allwine Rommel*
ATTORNEYS

INVENTOR
Conrad R. Keys

Oct. 20, 1959 C. R. KEYS 2,909,296
LOAD HANDLING EQUIPMENT AND RECEPTACLES FOR VEHICULAR
TRANSPORTATION AND DISCHARGE OF LOADS
Filed Feb. 9, 1956 5 Sheets-Sheet 5

INVENTOR
Conrad R. Keys

BY
ATTORNEYS

United States Patent Office

2,909,296
Patented Oct. 20, 1959

2,909,296

LOAD HANDLING EQUIPMENT AND RECEPTACLES FOR VEHICULAR TRANSPORTATION AND DISCHARGE OF LOADS

Conrad R. Keys, Newark, N.J.

Application February 9, 1956, Serial No. 564,427

13 Claims. (Cl. 214—310)

This invention relates to improved means to economically and expeditiously handle materials of considerable bulk. It includes a receptacle provided with means to enable facile and economical discharge of its load.

A further object of this invention is the provision of load handling equipment which may consist of a transporting vehicle having load lifting and lowering hoist means associated therewith and a demountable receptacle adapted to contain huge loads; the vehicle and the receptacle having cooperating means to enable the receptacle to be readily lifted and lowered from the vehicle with its load intact and locked therein, means being provided to release the load from the receptacle with ease and uniformity of load arrangement.

Present merchandising necessitates the loading, transporting and discharging of huge loads which may consist of food stuffs in crates, boxes, cartons, bags, etc.; household appliances in boxes and cartons; beverages in boxes and cartons; building material such as lumber, cement, bricks and cinder blocks in bundles and cubes; hardware crated and boxed; medical and pharmaceutical supplies and military equipment and supplies. Such bulky loads are generally moved from warehouses to retailer outlets, etc., generally on frequent schedules. It is desirable in handling merchandise that the goods be moved from warehouse or other source of supply to retail and other outlets at hours when traffic conditions are least likely to delay transfer. It is therefore a purpose of this invention to provide a receptacle in which the desired goods may be stored and locked in the chamber or compartments thereof, having means to permit the hoisting of the receptacle in locked or closed position upon a vehicle. When the receptacle has been transported to the desired locus the receptacle may be deposited in locked position upon a deck or the ground and the vehicle may then be used for transferring other like receptacles. The vehicle is provided with improved means to cooperate with equipment upon the receptacle for the discharging of the load en masse from the receptacle upon a deck or the ground in neatly piled condition. All of this may be accomplished by a single operator.

A further object of this invention is the provision of an improved receptacle adapted for the reception of bulky loads, having associated therewith equipment which may be manipulated for the expeditious mass discharge of the load in substantially the same stacked condition that it occupied within the receptacle.

Other objects and advantages of this invention will be apparent during the course of the following detailed description.

In the accompanying drawings, forming a part of this specification, and wherein similar reference characters designate corresponding parts throughout the several views.

In the drawings wherein are shown various details of the invention, the letter A may generally designate a vehicle having associated therewith hydraulically controlled hoisting and lowering mechanism B. The improved receptacle C has associated therewith means D which cooperates with the hoisting and lowering means B of the vehicle for discharge of a load from the receptacle. Means E is provided upon the vehicle to aid in tilting the receptacle for load discharge.

The vehicle A includes a chassis frame 15 having running gear 16 both fore and aft. The hydraulically controlled hoisting and lowering means B includes a pair of lift arms 18, one at each rear side of the vehicle, pivoted at 19 upon a sub-frame construction 20 which is mounted upon the conventional chassis 16. The arms 18 are each provided with lift chains 20 and 21 adaptable for detachable connection with a receptacle C in a manner to be subsequently described for lifting and lowering the receptacle and for load discharge. The arms 18 are elevated and lowered by hydraulic means well known in the art, including cylinders 22 (Figure 4) attached movably to the sub-frame 20. Such type of hydraulically controlled equipment is shown in U.S. Patent 2,313,514. Other vehicle lifting and lowering mechanism may be used, if preferred, such as shown in U.S. Patent 2,069,697. This hydraulic mechanism is well known in the art and may be actuated from the cabin of the vehicle through suitable controls. The vehicle A may include one or more rear jack legs 41. They are collapsible and manipulated from the cab of the vehicle for stabilizing the position of the vehicle during load lifting and lowering actions.

Figure 1:
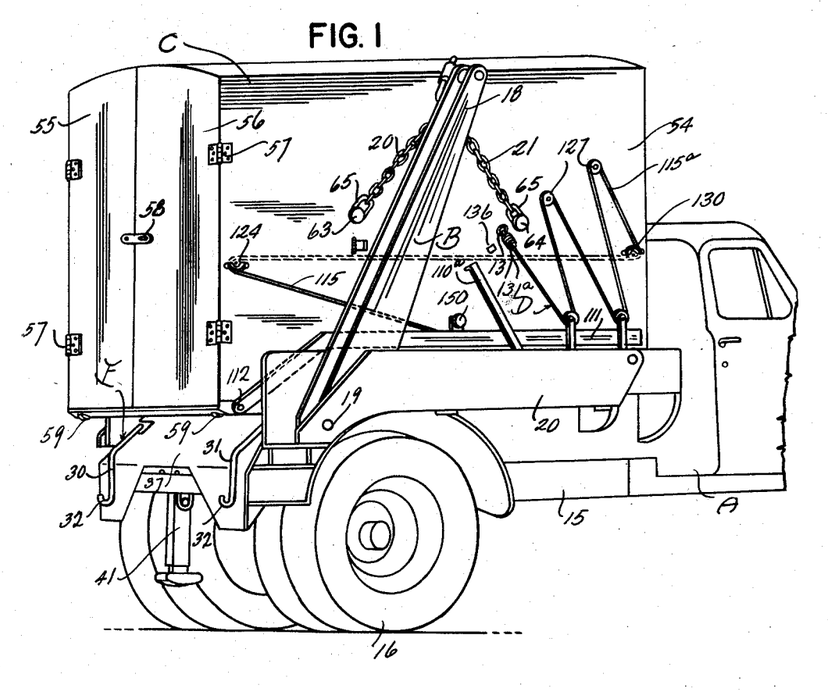
Figure 1 is a perspective view showing the improved receptacle mounted upon a transporting vehicle which is provided with hoisting and other means to facilitate the placement and removal of the receptacle with respect to the vehicle and the discharge of the load from the receptacle and vehicle.
Figure 2:
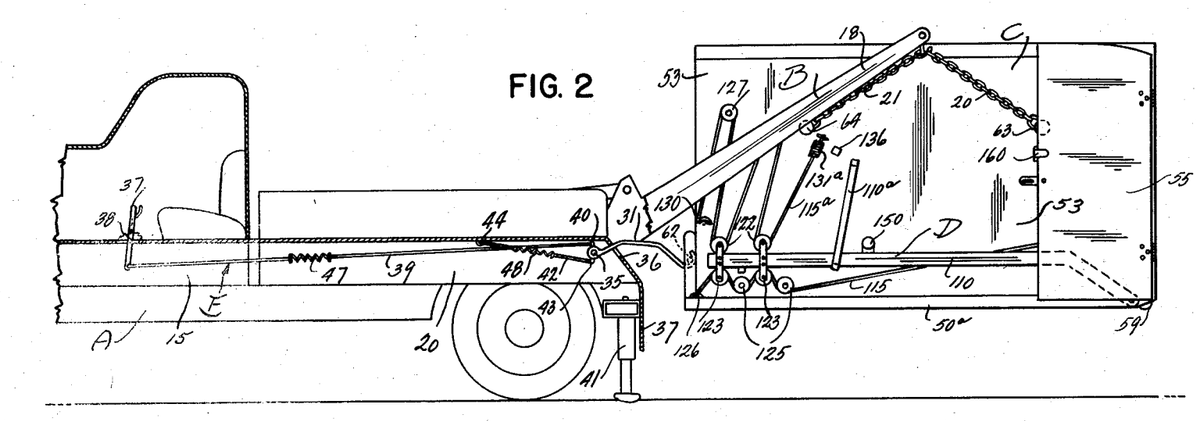
Figure 2 is a side elevation partly in section showing the vehicle and its hoisting and lowering mechanism supporting the receptacle at the rear of the vehicle ready for lowering of the receptacle to a tilted load discharging position.
Figure 3:
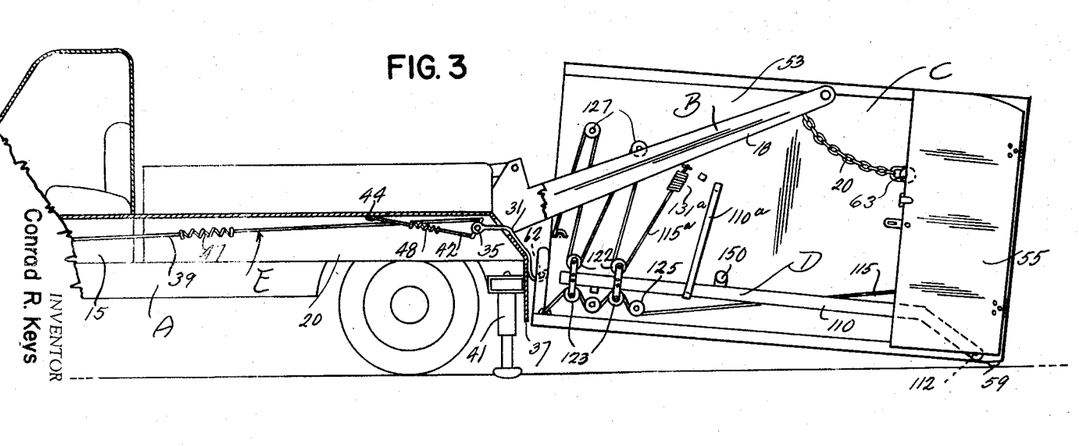
Figure 3 is a view similar to Figure 2, but showing the cooperating parts of the receptacle and vehicle tilting the receptacle just prior to discharge of the load from the receptacle.

The receptacle tilting means E includes a pair of arms 30 and 31, the free ends of which are hook shaped, as shown at 32. These arms are mounted upon the shaft or shafts 35 carried by the frame 20, as shown in Figure 2, with their ends extending through suitable openings 36 in the skirt 37 at the rear of the frame 20. As shown in Figure 1 they are provided at each side of the vehicle and their function is to aid in tilting the receptacle C for discharging its load. Normal collapsed positions of the arms 30 and 31 are shown in Figure 3. They may be elevated to the tripping position, as shown in Figure 2, by means of a pawl and ratchet control lever 37 pivoted at 38 upon the frame 15. The lower end of the lever 37 has a cable line 39 leading therefrom connected at 40 to one side of the pivot 35 of the trip arm. A second cable 42 is connected at 43 at the diametrically opposed side of the arm pivot 35. This cable 42 has a connection 44 upon the frame 20. The cables 39 and 40 are provided with tension springs 47 and 48 (Figures 2 and 3). With the lever 37 shoved forwardly (not shown) the spring 47 is relaxed and the spring 48 will pull the arm 31 to the collapsed position shown in Figure 1. The lever 37 when pulled rearwardly to the position shown in Figure 2, lifts the trip arms to the position shown in Figure 2. The receptacle C, when its weight is brought upon the trip arms 30 and 31 will lower them to the position shown in Figure 3. They act as fulcrums for tilting the receptacle C, as shown in Figure 3. The springs 47 will expand under the weight of the receptacle to lower the trip arms to the position shown in Figure 3.

The receptacle C is preferably of polygonal shape, generally rectangular, and includes a floor or bottom wall 50; front wall 51; top wall 52 and side walls 53 and 54. Rear closures 55 and 56 may be pivotally connected at 57 to the side walls 53 and 54; the same having suitable latching and locking means 58 which may consist of a hasp and padlock or any other locking means desired. The wall 52 is shown as dome shaped but it may be flat or of any other approved construction. The receptacle is of unitary one piece construction. The walls are preferably of metal and of such gauge as to be capable of supporting the desired loads to be handled and transported. The bottom wall 50 may be reinforced by structural beams, such as shown at 50a, along the sides, and cross beams may also be provided. Ground engaging rollers 59 are preferably provided upon the bottom structure of the receptacle C at the rear thereof adapted to engage the ground or a deck or other supporting surface when the receptacle is tilted to the position shown in Figure 4, for unloading. The inside surface of the floor 50 preferably has a low coefficient of friction, and if desired it may support a movable pallet. The receptacle may have closely spaced rollers projecting from its bottom surface to provide such anti-friction means. In lieu of the rear closures 55 and 56 it is within contemplation of this invention to provide a roll type top closure arrangement with suitable locking means thereon. The front wall 51 may be provided with suitable standards 60 and 61, welded or otherwise secured thereto, supporting a plurality of cross bars 62, any one of which may be engaged by the trip arms 30 and 31 to cause tilting of the receptacle C to dumping position, depending upon the angle of tilt desired. Merely a central trip arm can be used if desired.

The side walls 53 and 54 are each provided with hoist chain connecting lugs 63 and 64. Between them lies the normal center of gravity of the receptacle C and its contents.

Figure 5:
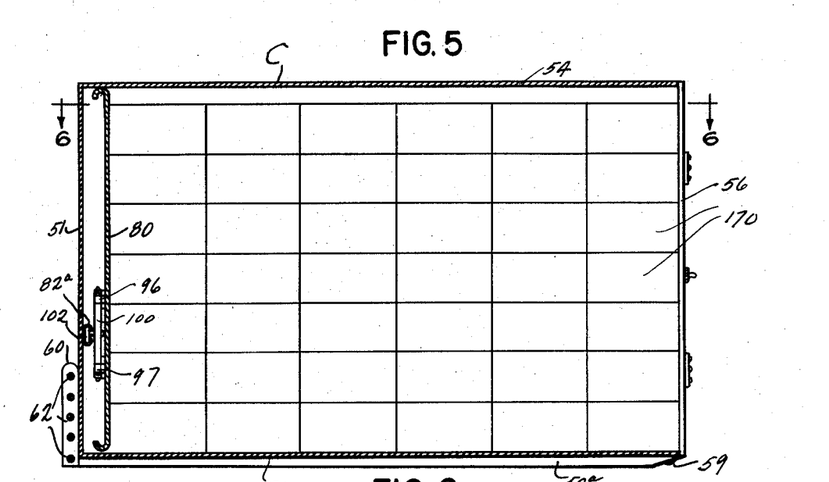
Figure 5 is a vertical cross sectional view taken through the receptacle, with its load therein; the view being taken upon the longitudinal center line of the vehicle, substantially on the line 5—5 of Figure 6.
Figure 6:
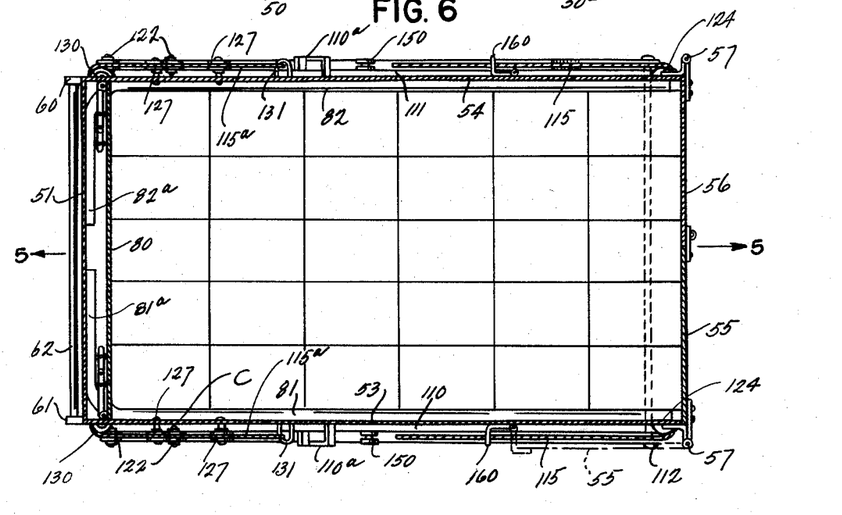
Figure 6 is a transverse cross sectional view taken through the receptacle substantially on the line 6—6 of Figure 5 and showing means by which the load may be discharged from the receptacle.

Referring to details of the means D to enable discharge of the load from the container C, I provide a vertical strong plate type load manipulating platen 80 which is mounted for movement fore and aft in the chamber of the receptacle C. Normally it is forwardly positioned as shown in Figures 5 and 6.

The means for mounting platen 80 for movement along the chamber of the receptacle preferably consist of trackways securely welded or otherwise fixed upon the inner surfaces of the front and side walls of the receptacle within which ride rollers carried by the platen. To that end, the surfaces of the side walls 54 and 55 are provided with tracks 81 and 82 which are extended at their front ends 81a and 82a around the inside of the front wall 51; being welded or otherwise secured thereto. These tracks are of channel shaped cross section, having channels 84 within which ride the track rollers 95 and 102.

Figure 9:
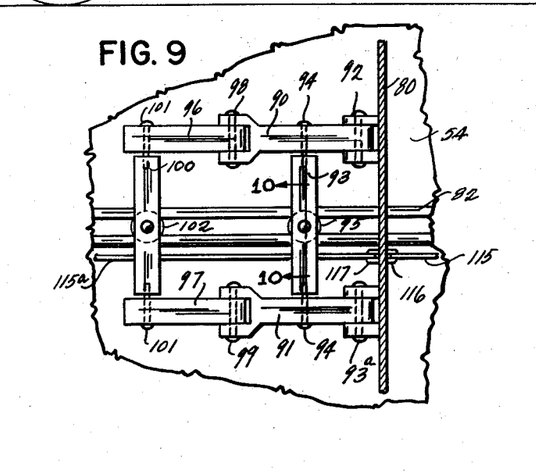
Figure 9 is a fragmentary side elevation, partly in section, showing a load moving platen and means by which it is mounted and guided upon the receptacle.
Figure 10:
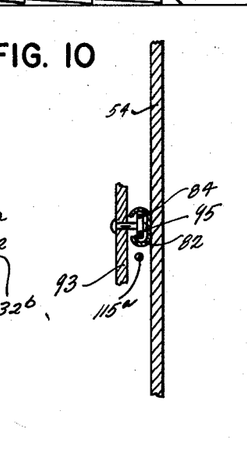
Figure 10 is a transverse cross sectional view taken through certain guide details of the load discharge platen; the view being taken substantially on the line 10—10 of Figure 9.

The platen 80, at each side thereof is provided with an articulate swinging arm construction upon which rollers are mounted. This construction is best shown in Figures 5, 6 and 9. Referring to Figure 9, each roller support includes upper and lower arms 90 and 91 respectively pivoted at 92 and 93a upon suitable ears connected to the platen 80 and so related that the same may collapse flat against the front side of the platen 80 in the position shown in Figure 6, or be extended at right angles thereto as shown in Figure 9. The arms 90 and 91 are transversely connected by a cross piece 93, pivoted at 94 upon the arms 90 and 91 at a location between the ends of said arms. Cross piece 93 supports a roller 95 which rides in the groove or channel 84 of the track along the front portion of the track and also the side portion thereof. The platen 80 is also provided with another pair of arms 96 and 97 pivoted at 98 and 99 respectively upon the free ends of the arms 90 and 91. The outer ends of the arms 96 and 97 support a cross piece 100 pivoted at 101. This cross piece 100 supports a roller 102 which also rides in the groove or channel of the track. With the platen 80 most forwardly positioned in the chamber of the receptacle C, as shown in Figure 6, the roller supporting arms are collapsed parallel at the front side of the platen 80. The juncture of the tracks at the front corners of the receptacle C are curved. As the platen 80 moves rearwardly the articulated roller supporting arms enable the platen to move rearwardly in a plane at right angles to the longitudinal axis of the receptacle C, due to the fact that the arms will swing forwardly away from the platen until they are positioned at right angles to the plane of the platen. When this occurs the rollers 95 and 102 will be riding along the portions 81 and 82 of the tracks. This is shown in Figure 9.

Figure 7:
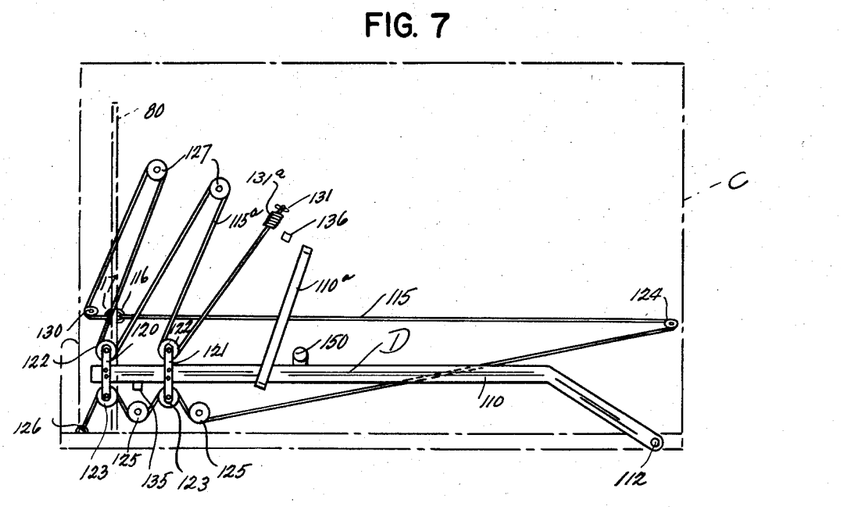
Figure 7 is a diagrammatic view showing load discharge details associated with the receptacle (one side only being shown), in a position they would occupy with the receptacle at rest upon the vehicle or ground or a deck.

The means for causing the platen 80 to move fore and aft along the chamber of the receptacle C may be power actuated in any approved manner. I prefer to take advantage of the weight of the receptacle C and the suspension means afforded by the hoisting mechanism of the vehicle for moving the platen over the relatively long distance from front to rear of the receptacle. To that end I provide externally upon the receptacle C, at each side thereof, lever arms or bars 110 and 111 which are fixedly connected at their rear ends to a shaft 112 which is axially pivoted upon the receptacle frame. They may be independently pivoted, but it is preferred to have the levers 110 and 111 move together. As is shown in Figure 7 the levers 110 and 111 may be angled intermediate their ends whereby the fore portions lie substantially horizontal when the platen is most forwardly positioned, as shown in Figure 7. I prefer to provide a distance multiplying means for causing the platen to travel the long distance along the chamber of the receptacle C. To that end I provide a cable 115, at each side of the receptacle, one for each arm 110 and 111. One end of each cable 115 is secured at 116 to the front side of the platen 80 and the opposite end is secured at 126 to the floor frame. I also provide a complementary cable 115a for each arm 110 and 111 secured at an end 117 to the front side of platen 80. The opposite end of the cable is secured at 131 to the adjacent side wall of the receptacle. The front end of each of the arms 110 and 111 is provided with a plurality of roller supporting brackets 120 and 121, but more may be provided if desired, depending upon the length of the receptacle and the vertical angled distance which the lever arms 110 and 111 move on their pivot axes. These brackets may be pivoted on fixed axes to the arm 110 or rigidly connected thereto if found desirable. Each of the brackets 120 and 121 supports sheaves or pulleys 122 at their upper ends above the lever arms 110 or 111 and sheaves or pulleys 123 at their lower ends below said levers, appreciably spaced axially from the upper sheaves or pulleys 122 (see Figures 7 and 8).

The cables 115 extend from their connections at 116 upon platen 80 rearwardly along the inner side of the side walls 53 and 54. They are each trained around a pulley or sheave 124 rotatably mounted upon each side wall of the receptacle. They then pass over the sheaves 124 to the outer sides of the side walls (see Fig. 1) and are forwardly trained around pairs of sheaves or pulleys 125 rotatably mounted on fixed axes upon each of the side walls of the receptacle. These pulleys 125 are disposed in alternating relation with the pulleys 123. In other words, each cable 115 zig-zags in trained relation about the pulleys 123 and 125, as shown in the drawings and its forward end is fixedly connected at 126 upon the fore part of the receptacle structure.

For the cables 115$^a$ pairs of spaced pulleys or sheaves 127 are rotatably mounted on fixed axes upon each side wall of the receptacle, apreciably spaced above the sheaves and pulleys 123 and 125 above described. The cables 115$^a$ from their inside connections upon the platen 80 are trained to the outside of the receptacle C about pulleys or sheaves 130 and then extended in zig-zag trained relation over the pulleys 122 and 127. Their opposite ends have fixed connections at 131 upon the outside of the receptacle wall. A spring 131$^a$ is provided as part of cable 115$^a$ to absorb any slack.

Figure 8:
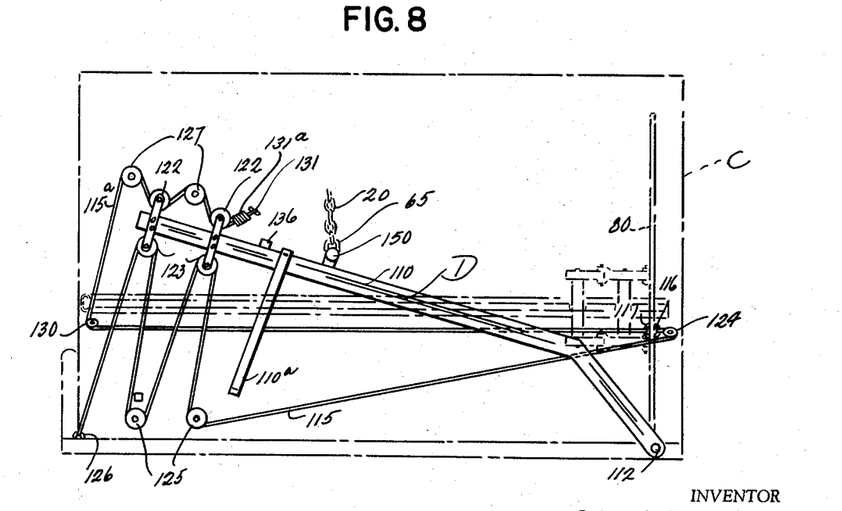
Figure 8 is a view similar to Figure 7, but showing the relation of the load discharge details of Figure 7 after load discharge.

The angle through which each arm 110 and 111 moves is designated in Figures 7 and 8. In their lowermost positions each rests against a stop 135, and a stop 136 is provided upon the receptacle to limit each of their upper positions, as shown in Figure 8.

It is quite obvious that movement of each set of lever arms 110 and 111 through the small angle between the positions shown in Figures 7 and 8 will cause the platen 80 to travel the long distance between platen positions shown in Figures 7 and 8.

Figure 11:
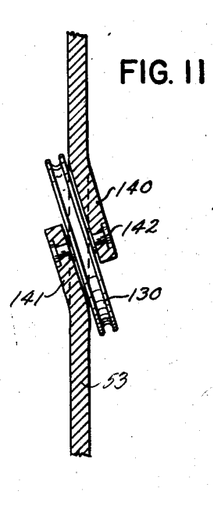
Figure 11 is a cross sectional view taken substantially on the line 11—11 of Figure 4.

In Figure 11 it is shown how the sheaves or pulleys 124 and 130 may be mounted to enable the cables to extend from the inner sides of the walls of the receptacle to their outer side and travel closely along the surfaces of said walls. In this view, bracket arms designated at 140 and 141 support the sheaves shaft 142.

The lever arms 110 and 111, intermediate their ends, and further to the front than the transverse center of gravity of the receptacle, are provided with lugs 150 for receiving key plates 65 of either or both of the lift chains 20 and 21.

Referring to the load discharge operation the jack leg 41 is lowered to the position shown in Figure 2; receptacle C is lifted and moved by the hoist arms 18 from the deck of the vehicle (shown in Figure 1) to the position shown in Figure 2. The operator actuates the mechanism E in order that the tilting hooks 30 and 31 will engage the desired dumping bar 62 (see Figure 2). While in this position the doors or closures 55 and 56 may be swung open and latched in opened positions against the sides of the recptacle, by means of the latching or securing means 160.

Figure 4:
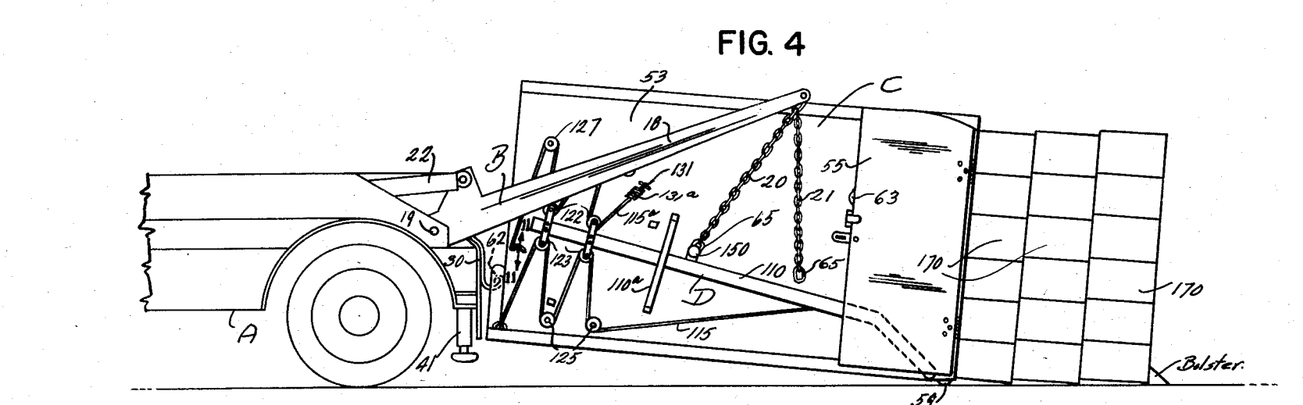
Figure 4 is a view of the receptacle and vehicle and its hoisting equipment showing a succeeding step during which the load is discharged from the receptacle.

The operator then lowers the receptacle by means of hoist arms 18 until it is supported in the tilted position shown in Figure 3; the wheels 59 contacting the ground. The key plates of the lift chains 20 and 21 are then detached from lugs 63 and 64 and the arms 18 are lowered. The operator attaches a key plate of one of the lift chains at each side of the receptacle C upon the lugs 150 of the lever arms 110 and 111. The operator places the transmission of the vehicle in neutral position and releases the parking brake upon the vehicle. The jack leg or legs 41 are raised. The operator through the hydraulic mechanism then starts the lift arms 18 upwardly. When the receptacle attached lift chains become taut the lever arms 110 and 111 will be rotated. The strain during this lifting operation is mostly placed upon the cables 115, and the strain upon the cables 115$^a$ is slackened. This causes the platen 80 to move rearwardly, pushing against the load in the receptacle C to a point where the force exerted overcomes the friction of the load resting upon the floor of the receptacle. The load material is forced out of the rear opening of the receptacle C. When the material comprising the load comes into contact with the ground it offers resistance considerably greater than that presented by the frictional engagement of the load against the floor of the receptacle. The energy from the lift arms is converted into a horizontal force which causes the vehicle and the receptacle attached to it to move away from the load being discharged until the cable actuating arms 110 and 111 have reached the limit of travel against the stops 136 (see Figure 8). At this time the platen has discharged the load in a self-supporting uniformally stacked pile, substantially the same as the articles were stacked within the receptacle prior to discharge. The discharging operation is shown in Figure 4 wherein is shown the uniformity with which the different articles 170, comprising the load, will be discharged, in stacked position. When the platen has moved to its rear discharge positon the vehicle may be moved forward a short distance by engaging the transmission and either at that time or just prior thereto, the lift arms will be lowered. The weght of the lever arms 110 and 111 is sufficient to return the platen 80 to its most forward position in the receptacle. The key plates are disconnected from lugs 150 and placed on lugs 63 and 64 of the receptacle and at which time the empty receptacle C can be lifted onto the vehicle for transportation to a desired location.

Figure 12:
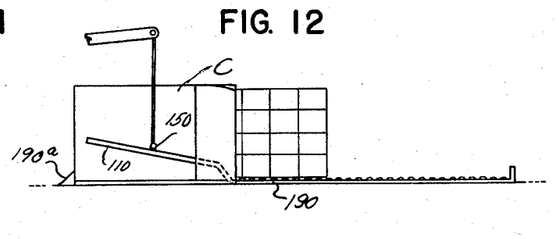
Figure 12 is a view showing another means for discharging a load from the receptacle.

The particular hoist mechanism of the vehicle above described need not be used to unload, since it is contemplated to utilize a crane or other type of hoist for this. A front end bolster 190$^a$ may be used against the receptacle C if necessary. In this connection I may use a roller string 190 (see Figure 12) onto which the articles may be discharged as the crane lifts the platen control arms 110 and 111. This type of unloading can be accomplished on ground or deck.

Under some circumstances it may be desirable to have a receptacle without rear closure doors, or a top. In fact it may be a cage or other frame type structure.

It is contemplated that goods handled by this invention will often be packaged foodstuffs and other merchandise. Often the packaging, after goods are placed in retail outlets or destination before final sale, needs to be moved to a salvage point or to a dump in case they are waste. The device herein shown is capable of discharging such salvage or waste material, being cartons or boxes in which may have been placed some vegetable or animal matter, also waste material. This discharge may be accomplished while the container remains on the deck of the vehicle, in which case it might be desirable to arrange a restraining hook on frame 20 to engage bar 62 at the front of the container. In cases where waste material is to be discharged over the edge of a dump, the container may be set down on an incline or level and the operation above described will shove the contents out of the container so that the contents will tumble over the bank. In that case the vehicle would remain stationary.

Figure 13:
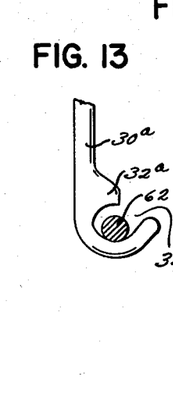
Figure 13 is a modified form of receptacle tilting hook.

The hooks or hook 30 and 31 may have a safety extension as shown for a similar hook 30$^a$ at 32$^a$. This would be provided so that bar 62 would not disengage from the hooks when in fully retracted position as shown in Figure 3 due to a vertical lift, but would disengage when the hook is extended as shown in Figure 2 because the diameter of space 32$^b$ is greater than the diameter of bar 62.

Supporting and ground straps 110$^a$ are secured to the outer sides of the receptacle C for supporting and guiding movements of the arms 110 and 111.

If desired the vehicle A may assist in unloading the receptacle C through forward movement under the vehicle's normally applied power from the position of parts shown in Figure 4.

Various changes in the size, shape and arrangement of parts may be made to the form of invention herein shown and described without departing from the spirit of the invention or scope of the claims.

I claim:

1. In load handling equipment the combination of a transporting vehicle having load lifting and lowering hoist means thereon for operation to lift a load onto the vehicle from the rear and lowering it from the vehicle rearwardly upon a ground or other surface, a receptacle having a chamber therein and a rear opening through which a load may be stacked in the receptacle or rearwardly removed with respect to its chamber, receptacle tilting means mounted upon the vehicle and receptacle for holding the front end of the receptacle elevated with respect to the rear end as the hoist means lowers the receptacle rear end for load discharge purposes, a load discharging platen movably mounted in the chamber of the receptacle for fore and aft movement, and power actuated means mounted upon the receptacle for moving said platen from the front to the rear of the chamber for discharging a load from the receptacle chamber while the receptacle is held in tilted position by said vehicle.

2. The combination as described in claim 1 in which means is provided upon the receptacle for attachment to the load lifting and lowering hoist means of the vehicle for causing the rearward movement of the platen to discharge a load from said receptacle upon load lifting movement of said hoist means.

3. In load handling equipment, the combination of a vehicle, a receptacle having a chamber and a rear load receiving and discharge opening, the closure means being such that it may be opened to bodily discharge the load en masse from the receptacle in substantially the same load relationship that it occupied in the receptacle, receptacle power actuated hoist means mounted upon the vehicle for lifting and lowering the receptacle onto the vehicle or entirely rearwardly therefrom to a ground or other surface, and means mounted upon the receptacle for detachable connection to said hoist means when the receptacle is on the ground surface to cause rearward ejection of a load from the receptacle en masse upon substantially the same ground level upon which the vehicle is standing in substantially the same loaded relationship which the load occupied within the chamber of the receptacle.

4. A load handling receptacle comprising a receptacle body having a chamber therein and rear closure means for sealing the chamber, a load ejecting member, guide means positioned upon the receptacle inside of the chamber mounting the load ejecting member upon the receptacle for movement fore and aft along the chamber, and power actuated means for moving said load ejecting member comprising an arm pivotally mounted rearwardly upon the receptacle and extending forwardly and swingable in a predetermined arc with its fore end movable in an up and down direction and distance multiplying means connecting the load ejecting member to the fore end of said arm for moving the load ejecting member along the chamber as aforesaid by small angular movement of the arm upon the receptacle, said distance multiplying means comprising sheaves mounted upon the movable end of the arm both above and below the arm, sheaves mounted upon the receptacle below the arm in recurrent relation with respect to the lower sheaves upon the arm, a cable connected to the fore end of the receptacle at one end and zig-zag trained over the lower sheaves of the arm and the sheaves which are upon the receptacle below the arm, a sheave mounted on the rear end of the receptacle having said cable trained thereover and extended forwardly and connected to said load ejecting member, a second set of sheaves mounted upwardly upon the receptacle in recurrent relation with respect to the uppermost sheaves mounted upon said arm, a second cable connected at an end to the front of the receptacle and trained in zig-zag relation over the upper sheaves of the arm and the sheaves mounted upon said receptacle above the arm and having its opposite end connected to said load ejecting member.

5. A load manipulating and handling receptacle as defined in claim 4 in which the pivoted arm, sheaves and cables are duplicated upon opposite sides of the receptacle and located externally thereon and extended internally into the chamber of the receptacle and there connected to the load ejecting member as described.

6. Load transporting means comprising a receptacle having bottom, front, side and top walls defining a load receiving chamber therein with a rear opening, said opening being of substantially the same area as the cross sectional area of the chamber of said receptacle, trackways extending along the inner side walls of the receptacle fore and aft along the chamber and extended within said chamber along the inside of the front wall of the receptacle, a load ejecting platen, and articulated anti-friction devices carried by said platen and operable along said trackways both along the front wall of the receptacle and along the side walls thereof for moving the platen fore and aft along said chamber in a plane substantially at right angles to the fore and aft axis of said chamber.

7. A receptacle as defined in claim 6 in which each articulated anti-friction device comprises a plurality of relatively pivoted arms for its trackway having a plurality of relatively spaced rollers supported thereon, said arms having a swingable connection with said platen.

8. In a transportable load handling receptacle the combination of a receptacle body having a chamber therein and rear closure means for sealing said chamber, a load ejecting member, guide means mounted upon the receptacle inside of the chamber mounting the load ejecting member upon the sides of the receptacle for movement fore and aft along the chamber thereof, and power actuated means for moving said load ejecting member along said receptacle chamber comprising an arm pivotally mounted rearwardly upon the receptacle and extending forwardly of the receptacle and swingable in a predetermined arc with its fore end movable in an up and down direction, and distance multiplying means connecting the load ejecting member to the movable fore end of said arm for moving the load ejecting member over a relatively long distance from end to end of the chamber by small angular movements of the arm upon said receptacle.

9. Load handling equipment as defined in claim 8 in which the weight of the arm is of itself sufficient to return itself and the load ejecting member to normal receptacle loading positions in the absence of any power applied for moving said arm.

10. In load handling equipment the combination of a transporting vehicle including running gear and a supporting frame elevated above the normal ground level with which the running gear engages, a receptacle movably mounted upon the frame, power actuated hoist means mounted upon the vehicle including means to lift the receptacle movably mounted upon the frame from ground surface bodily into supported relation upon the vehicle frame and also means to move the receptacle off of the frame bodily to a horizontally supported position above the ground level entirely to the rear of the vehicle, means on the vehicle and receptacle to fulcrum the front end of the receptacle upon the vehicle as it is supported by the hoist means while off of the frame of the vehicle whereby the rear end of the receptacle may be lowered by the hoist means into ground engagement for supporting the receptacle in a downward slanting from front to rear position, a platen movably mounted in the receptacle between the fulcrumed front end thereof and the lowered rear end thereof for load discharging purposes, and platen moving means mounted upon the receptacle to cause movement of the platen along the receptacle for load discharge purposes, the last mentioned means having a connection for attachment to the hoist means to cause load discharge movement of the platen along the receptacle upon elevating movement of the hoist means.

11. Load handling equipment as set forth in claim 1 in which the receptacle tilting means comprises supporting hook means mounted upon the vehicle at the extreme rear end thereof, and means provided upon the receptacle at the front end thereof for engaging said hook means at various elevations along the height of the receptacle for holding said front end of the receptacle at a selected elevation with respect to the rear end of the receptacle as the hoist means manipulates the receptacle for load discharge purposes whereby to give the receptacle a desired downward slant from front to rear for load discharge purposes.

12. A load handling receptacle comprising a receptacle body having a chamber therein and a rear load receiving and discharge opening, a load ejecting member, guide means positioned upon the receptacle inside of the chamber mounting the load ejecting member upon the receptacle for movement fore and aft along the chamber, power actuated means for moving said load ejecting member comprising an arm pivotally mounted upon the receptacle and swingable through a predetermined arc in an up and down direction, and distance multiplying means connecting the load ejecting member to the swinging end of said arm for moving the load ejecting member along the chamber as aforesaid by small angular movements of the arm upon the receptacle, said distance multiplying means comprising a cable having connection at its ends with the receptacle and the load ejecting member and trained in zig-zag relation over spaced guides positioned both upon the swinging end of the arm and the receptacle.

13. Load handling equipment comprising a load transporting vehicle having a chassis, running gear, and a deck upon the chassis, lifting and lowering hoist arms pivotally mounted upon the vehicle at the rear thereof and swingable forwardly over the vehicle and rearwardly therefrom, a load handling receptacle having walls defining a chamber therein and a rear load receiving and discharge opening, trip hook means pivotally mounted upon the chassis at a location below the deck and at the rear of the chassis, means to swing the trip hook means to the rear of the vehicle to an operating position below the deck of the vehicle, said receptacle having means thereon for releasable connection with the hoist arms so that they can swing the receptacle upon the deck and move it therefrom rearwardly so that it may be bodily rested upon a ground surface entirely to the rear of the vehicle, means mounted at the front end of the receptacle for engagement with the trip hook means to hold the front end of the receptacle at a desired elevation as the hoist arms are lowered to permit the rear end of the receptacle to lower to a ground position whereby the receptacle assumes a downward front to rear slant to permit the contents thereof to be bodily discharged through the rear opening of the receptacle in substantially the same relationship as the parts of the load occupied within the chamber of the receptacle, and a platen movably mounted in the chamber of the receptacle having means for movement from front to rear and vice versa, and means mounted upon the receptacle engageable by the hoist arms when the receptacle is held by the trip hook means in a slanting position and also when the receptacle is horizontally positioned upon the ground to the rear of the vehicle for moving the platen from front to rear as the hoist arms are elevated for bodily ejecting the contents of the receptacle through the rear opening of the receptacle.

References Cited in the file of this patent

UNITED STATES PATENTS

| | | |
|---|---|---|
| 2,345,790 | Brooks | Apr. 4, 1944 |
| 2,574,315 | Atkinson | Nov. 6, 1951 |
| 2,694,449 | Mohrlang et al. | Nov. 16, 1954 |
| 2,753,057 | Miller | July 3, 1956 |
| 2,797,830 | Evans | July 2, 1957 |
| 2,815,874 | Kowal | Dec. 10, 1957 |

UNITED STATES PATENT OFFICE
CERTIFICATE OF CORRECTION

Patent No. 2,909,296                          October 20, 1959

Conrad R. Keys

It is hereby certified that error appears in the printed specification of the above numbered patent requiring correction and that the said Letters Patent should read as corrected below.

Column 8, line 65, strike out "movably mounted upon the frame"; line 66, before "ground" insert -- a --.

Signed and sealed this 29th day of March 1960.

(SEAL)
Attest:

KARL H. AXLINE
Attesting Officer

ROBERT C. WATSON
Commissioner of Patents